INVENTOR:
Robert Ashton
by James E. Nilles
Attorney

Aug. 26, 1958  R. ASHTON  2,849,118
FANNING MILL FOR COMBINES
Filed Feb. 20, 1956  4 Sheets-Sheet 3

INVENTOR:
Robert Ashton
by James E. Nilles
Attorney

Aug. 26, 1958 R. ASHTON 2,849,118
FANNING MILL FOR COMBINES
Filed Feb. 20, 1956 4 Sheets-Sheet 4

INVENTOR.
Robert Ashton
BY
James E. Nilles
Attorney.

United States Patent Office 2,849,118
Patented Aug. 26, 1958

2,849,118

FANNING MILL FOR COMBINES

Robert Ashton, Toronto, Ontario, Canada, assignor to Massey-Ferguson Inc., a corporation of Maryland Application February 20, 1956, Serial No. 566,708

3 Claims. (Cl. 209—318)

This invention relates to fanning mills for the cleaning mechanism of a combine.

The cleaning mechanism for a combine usually includes a grain pan which receives threshed grain and foreign matter, such as chaff, particles of straw, and green seeds from the threshing cylinder and straw walkers, and delivers it to the cleaning sieves. The cleaning sieves or screens are usually mounted for a combined reciprocatory and rotary motion which causes the foreign matter to move rearwardly across the screen toward the rear of the combine while the grain falls through the perforated screen where it is collected and conveyed to a storage tank located elsewhere on the combine. At the same time, an air blast is caused to pass upwardly and rearwardly through the sieves which lifts the lighter foreign material off of the sieves, thereby facilitating the separation of the grain from the foreign matter and consequently the passage of the heavier grain through the sieve openings. The foreign matter is thereby lifted and blown from the open rear end of the combine. For maximum separating efficiency a balanced condition must prevail at the sieves between air resistance of the layer of crop material on the sieves and the air pressure beneath the sieves. The ideal balanced condition occurs when no grain is carried out with the refuse, but the latter is quickly moved out of the machine and prevented from accumulating therein.

When operating on a hillside the combine is tipped to one side or the other, the layer of crop material naturally becomes thicker on the low side. Many air deflecting and leveling devices have been proposed to correct this situation and some have met with reasonable success. Conventional fanning mills, often referred to simply as fans or blowers, are made as a single unit across their width. That is to say, a single fan serves to deliver an air blast across the entire width of the cleaning mechanism. If one side of the sieves is loaded more heavily than the other, a greater precentage of the air being delivered will pass through the side of least resistance, i. e., the less heavily loaded side. Stated otherwise, the distribution of air is not properly controlled across the width of the sieves. In other instances, the entire width of the sieve may be loaded or the central portion more heavily loaded than the sides and the air, which is often introduced into the fan only at the ends of the fan, does not reach the center of the fan but simply passes up through along either side of the sieves. That is, the volume of air being delivered by any increment of length of the fan will not be equal.

The direction in which the wind is blowing, relative to the combine also effects the efficiency of the fan unit. For instance, wind blowing into the fan inlet increases the amount of air delivered through the sieves and upsets the previously balanced condition.

Another difficulty experienced with fanning mills for a combine is that the mill is necessarily located under the combine and next to the ground. A considerable amount of dust, dirt and other trash often "boils" about in the air in this area and is thereby introduced into the fan.

It is an object of this invention to provide a fanning mill for a harvester which overcomes, to a great degree, the above mentioned difficulties.

It is another object of the invention to provide a fanning mill, for the cleaning mechanism of a combine, having a plurality of air inlets which results in good air distribution across the entire width of the mechanism.

Another object of the invention is to provide a fanning mill for a combine having its inlets so located so as to minimize the effects of the wind and which eliminates to a substantial degree, the entry of dirt, dust, etc., into the mill.

It is still another object of this invention to provide a fanning mill for a combine harvester having its air inlets so constructed and arranged so as to insure a steady delivery of relatively clean air to the cleaning mechanism.

It is another object of the invention to provide a fanning mill for a combine having a plurality of separate fans with individual air intakes provided for each fan.

Other objects and advantages of this invention will become more apparent from the following detailed description and attached sheets of drawings wherein a form of the invention is illustrated. Accordingly, the present invention may be considered as comprising the various constructions, combinations, or sub-combinations of parts as is hereinafter more fully set forth in the detailed description and in the claims, reference being had to the accompanying drawings in which:

Figure 1:
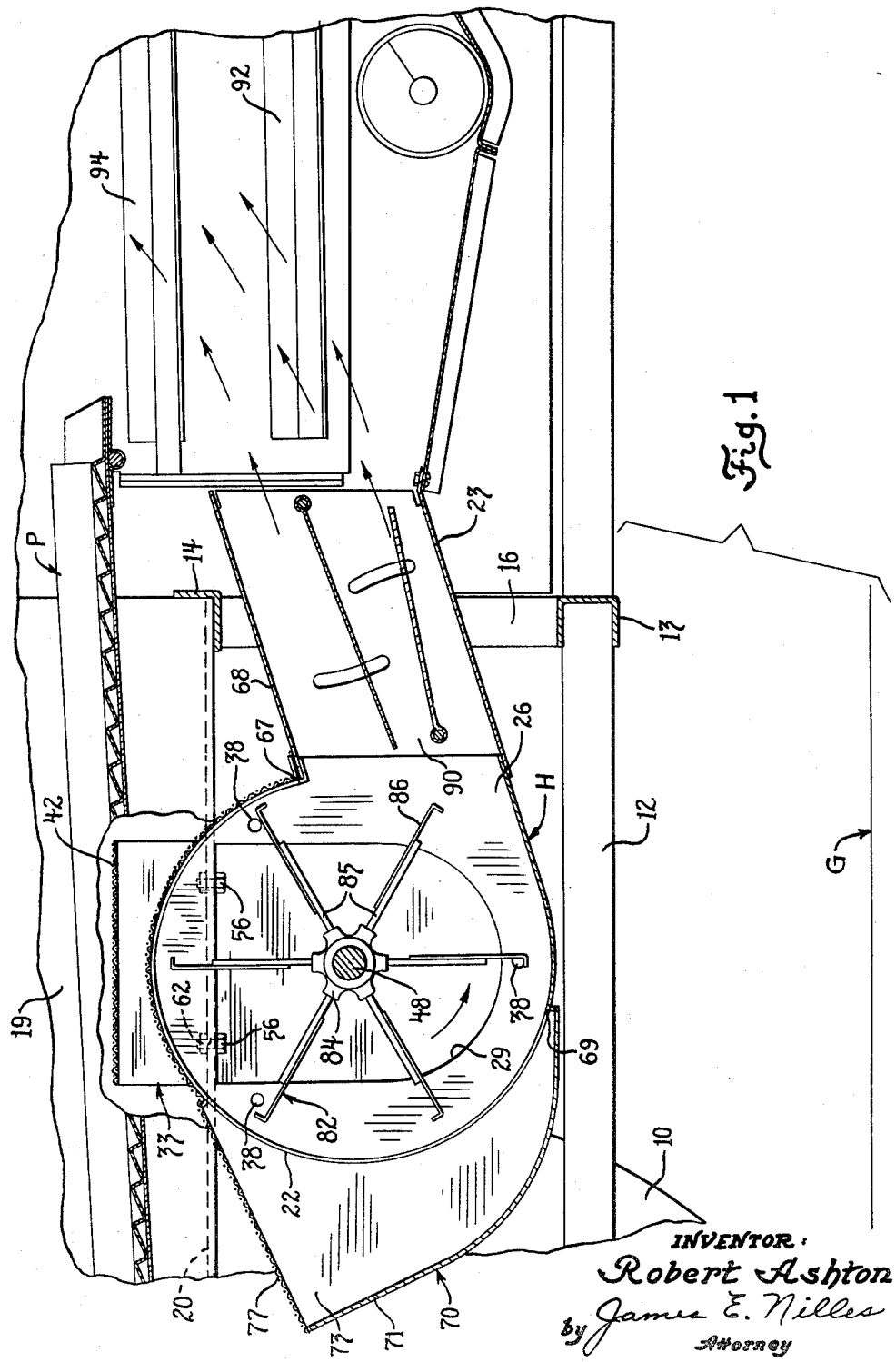
Figure 1 is an elevational side view, in section and with parts broken away, of a fanning mill made in accordance with the invention and as embodied in a threshing mechanism.
Figure 3:
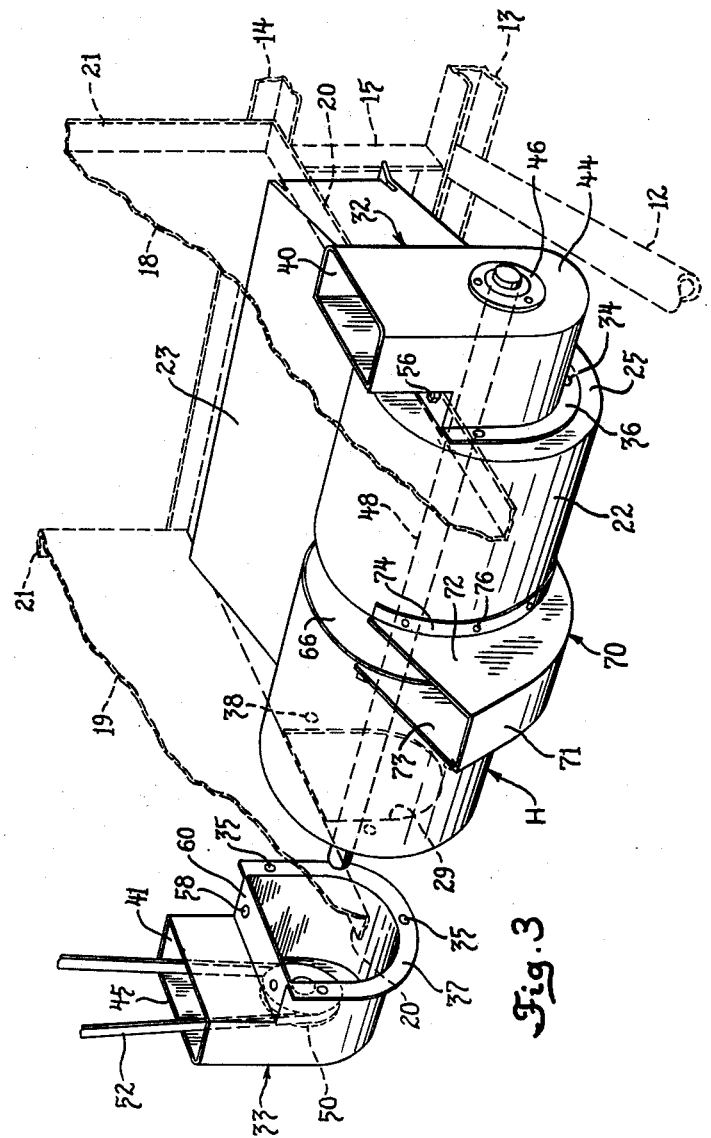
Figure 3 is a partially exploded perspective view, on a reduced scale, of the device shown in Figure 1, with certain parts removed.

Referring more particularly to Figures 1 and 3 of the drawings, the invention is illustrated as applied to a combine which is adapted to be moved over the crop at a constant height from the ground by the front wheels 10 and rear wheels (not shown). The framework of the combine comprises a fore and aft extending tubular member 12 at each side which are welded at their rear ends to the transversely arranged channel member 13. A second transversely positioned angle iron member 14 is secured to member 13 by a vertical brace 15, 16 at either side. Sheet metal side walls 18, 19 are located at either side and each have an outwardly turned lower flange 20 and rear flange 21. The framework thus formed may be considered as a rigid integral support structure.

Between the side walls 18, 19 and located generally below them is the elongated fanning mill housing H. It will be noted that the fanning mill is located beneath the conventional grain pan P and closely adjacent the ground G. The complete housing H comprises an elongated cylindrical shaped fan chamber 22 having its outlet in the form of a delivery chamber 23 extending tangentially therefrom in a rearward direction. The housing also has end walls 25, 26 welded thereto which encloses chambers 22 and 23. Openings 28, 29 are provided in the end walls 25, 26, respectively, and side air intake chambers or ducts 32, 33 are positioned in air communication with the fan chamber. Ducts 32, 33 are attached by bolt means 34 which extend through registering holes 35 in flanges 36, 37 of ducts 32, 33, respectively, and holes 38 in the end walls 25, 26. The air intake chambers or ducts 32, 33 have an opening 40, 41 at their upper ends over which a screen 42 may be secured to preclude the entry of foreign objects therethrough. The ducts 32, 33 also comprise outer sides 44, 45, respectively to which are secured the bearings 46, 47. Rotatably mounted in these bearings is the fan shaft 48, and by so locating the bearings in the outer sides of the ducts no impediment is placed in the path of air in the form of mounting brackets and bearings. Pulley 50 is secured to the fan shaft within the duct. Means are provided to drive the shaft in the form of a flexible belt 52 which transmits power from any suitable conventional power source (not shown) usually mounted somewhere on the combine. Placing the pulley within the side intake chamber results not only in a compact arrangement, but one in which the pulley and the portion of the belt nearest the ground are shielded.

The entire housing H is rigidly secured to the flanges 20 of the support structure by bolt means 56 (Fig. 3) which extend through apertures 58 in the horizontally disposed portions 60 of the inlet chambers 32, 33 and through apertures 62 (Fig. 1) of flanges 20.

Thus the side air intake chambers 32, 33 provide a source of air for each end of the fan housing. The inlet openings 40, 41 are located a distance above the housing in an area where relatively clean air is obtainable. They are also located in an area where they are shielded from the wind by surrounding component parts of the combine.

Figure 2:
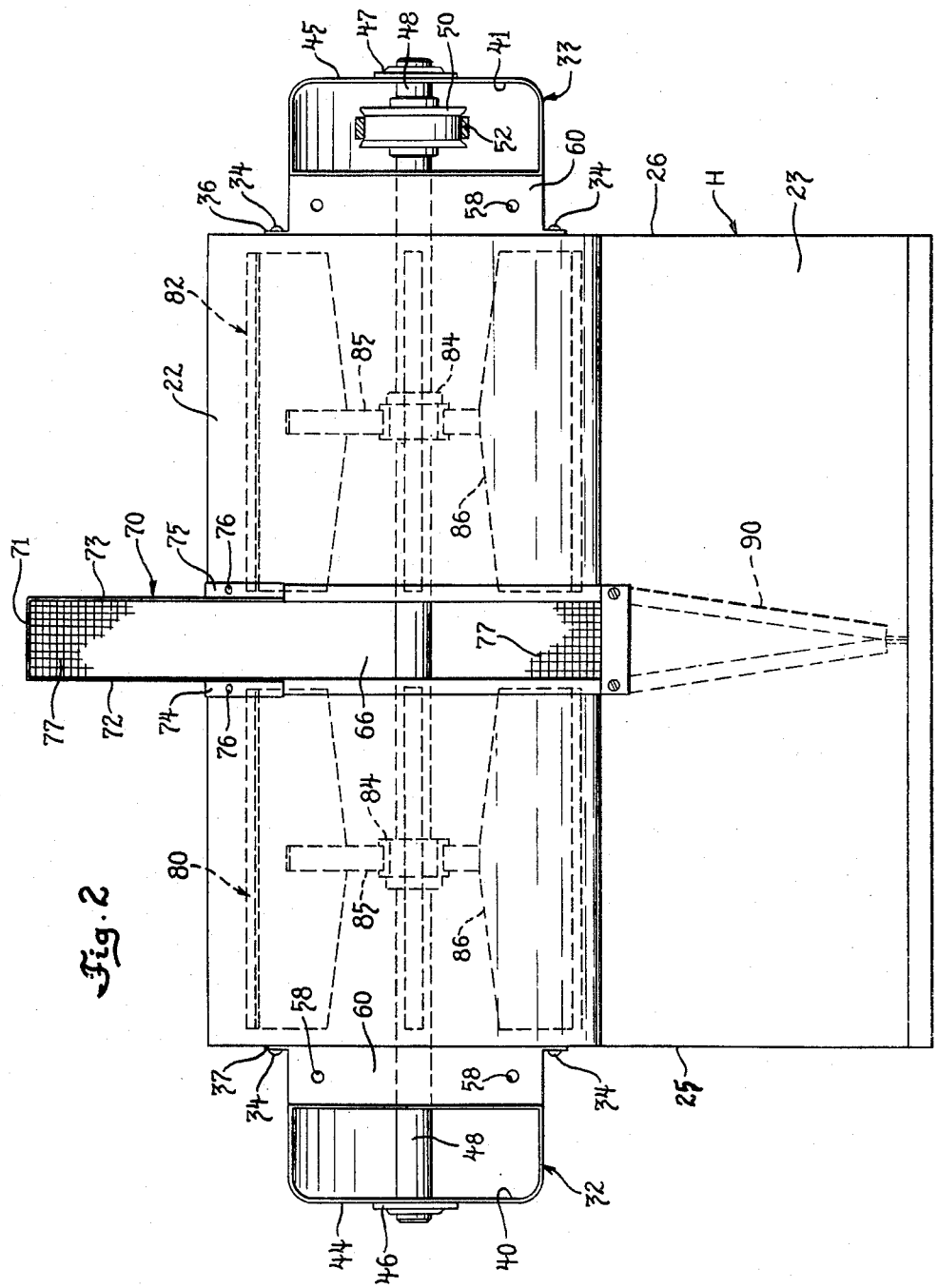
Figure 2 is a plan view of the device shown in Figure 1, with certain parts removed for the sake of clarity in the drawings.
Figure 4:
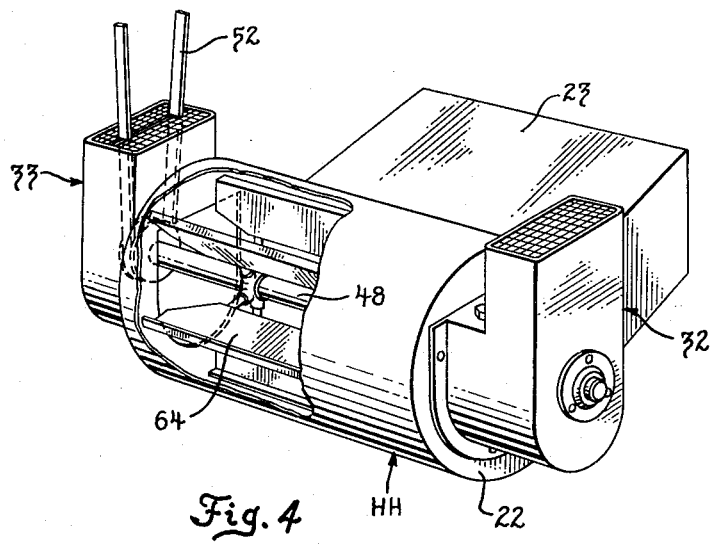
Figure 4 is a perspective view showing a modification of the invention.
Figure 5:
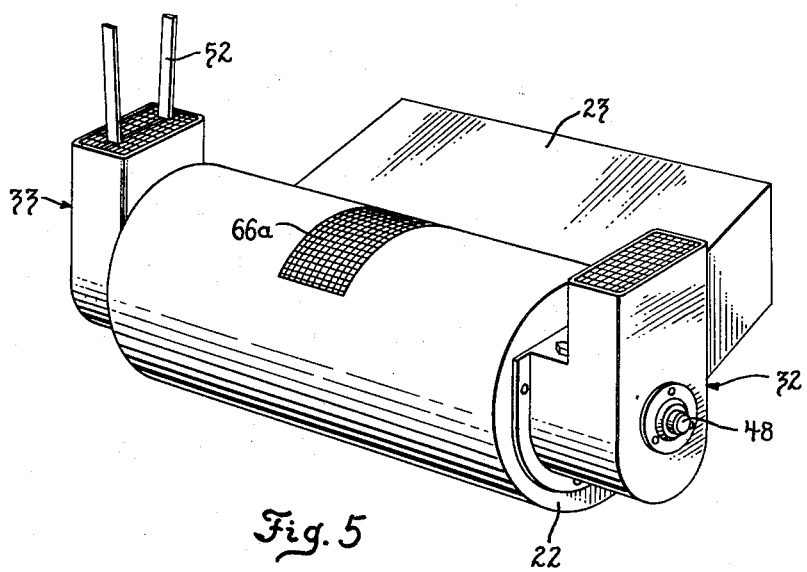
Figure 5 is a perspective view showing another modification of the invention.

A modification of the invention as illustrated by Figure 4 has the side ducts as above described. In this embodiment, however, the fan housing HH is shorter in length than those shown in the other figures and a single fan unit 64 is employed as distinguished from the plural fan units to be described presently.

Where the chamber 22 is of such length that air does not readily enter the central portion of the housing from either end, additional air intakes may be provided along the axial length of the chamber 22, as follows. As shown in Figures 1 through 3, the cylindrical casing 22 has an air receiving passageway 66 extending around a portion of its periphery and intermediate its ends. By referring to Figure 1, it will be seen the passageway 66 extends from the junction 67 of the cylindrical casing 22 and the top side 68 of chamber 23 around to the point 69 on the lower side of chamber 22. An intermediate downdraft duct or chamber 70 having an upwardly and forwardly curved front side 71, side-walls 72, 73 is secured to casing 22 and is in air delivery communication therewith. More particularly, the flanges 74, 75 of walls 72, 73 are secured, in any suitable manner as by bolt means 76, to casing 22. A screen 77 may be secured across the opening in the upper end of duct 70, which is formed by side walls 72, 73 and front side 71 and this screen also extends across the passageway 66 in the upper portion of casing 22. With the particular arrangement shown for illustrative purposes, air is sucked in through an extensive screen area and introduced into the fan chamber, intermediate its ends, and around a considerable portion of its periphery. In the central air intake structure shown, as in the side air intake chambers, the intermediate duct causes the air to be admitted to the housing at a relatively high distance from the ground where it is appreciably cleaner than the air nearer the surface of the ground. Chaff, dirt, dust straw and other trash material are thus prevented, to a considerable extent, from entering the fan housing. Figure 5 shows a modified opening 66a.

The embodiment of the invention shown in Figures 1 to 3 utilizes a plurality of separate fans in cooperation with a central intermediate air intake duct. This arrangement is particularly efficient in larger threshing mechanisms, that is, those of considerable width depending on the width of the cleaning mechanism, any number of intermediate intake systems and fan units may be provided.

As shown in these figures, by way of example, a fan 80 unit is mounted on shaft 48 at one side of the intermediate intake and another fan unit 82 is mounted on shaft 48 at the other side of the central opening. These fan units are identical so like numbers will designate identical parts. The fans comprise a hub 84 secured to shaft 48 having a series of circumferentially spaced and radial extending spokes 85 secured thereto. Fan blades 86 are secured to the outer ends of spokes 85 and together are substantially coextensive in length with the fan housing.

A vertically positioned and rearwardly converging baffle plate structure 90 is provided in delivery chamber 23 which serves to keep the air streams separate that are delivered by the separate fan units 80, 82. In this manner, a steady and positive delivery of air is assured across the entire width of the conventional cleaning sieves 92, 94. In other words, regardless of the amount and distribution of material on the sieves, the air does not merely shift to the side of least resistance, as in the case of a single source of air. Instead, the entire length of the blower is utilized to receive and to force air into the cleaning mechanism, and thereby separate streams of air are continually directed to their respective sieve areas.

It will now be appreciated, by those skilled in this art, that there has been provided a compact fanning mill having novel side air intake ducts which admit only clean air to the fan and also shields the latter from effects of the wind. Provision is also made, in accordance with another aspect of the invention, for providing air inlets along the axial length of the mill so as to insure that an even volume of air is received and delivered along the entire length of the mill. Separate fan units may also be provided, each receiving a supply of air at a location where the fan operates most efficiently, namely, through the ends of the fan or from endwise directions.

It should be understood that it is not intended to limit the invention to the above described forms and details, and that the invention includes such other forms and modifications as are embraced by the scope of the appended claims.

I claim:

1. In a combine, the combination comprising a main body supported a spaced distance from the ground on ground engaging wheels, a fanning mill having an elongated cylindrical fan chamber mounted beneath said main body and having an air inlet at each end thereof and a delivery chamber extending generally tangentially therefrom, an intake air chamber secured to each end of said fan chamber and over said inlets so as to place said fan chamber in air receiving communication with said intake chambers, said intake chambers extending generally upwardly along the opposite sides of said main body and terminating above said fan chamber and having intake openings adjacent their upper end, said fan chamber having an air receiving passageway intermediate its length and extending around a portion of its periphery, an intermediate duct secured to said fan chamber and in air communication therewith through said passageway, said intermediate duct extending in a generally upward direction to closely underlie said combine body and having an inlet opening adjacent its upper end.

2. In a combine, the combination comprising a main body supported a spaced distance from the ground on the ground engaging wheels, a fanning mill having a cylindrical fan housing mounted beneath said main body and having air intake openings at each end, an air intake chamber secured at each end of the housing and over said openings, said chambers being in air transmitting communication with the interior of said housing and being formed to extend upwardly along the opposite sides of said main body and terminate in air intake openings, a fan shaft extending freely through the air intake openings at the ends of said housing and into said chambers, and means for driving said shaft extending down along one side of said body and through an air intake opening in one of said chambers into driving engagement with said shaft so that the shaft and the portion of the driving means in engagement with the shaft are shielded by the surrounding chamber and housing.

3. In a combine, the combination comprising a main body supported a spaced distance from the ground on ground engaging wheels, a fanning mill having a cylindrical fan housing having air intake openings at each end, an air intake chamber secured at each end of the housing and over said openings, said chambers being in air transmitting communication with the interior of said housing and being formed to extend upwardly along the opposite sides of said main body and terminate in air intake openings, a fan shaft extending freely through the air intake openings at the ends of said housing and into said chambers, said shaft being rotatably supported at each end by said chambers, and means for securing the chambers to the underside of said combine body so as to rigidly support the mill in operative position, the housing and the fan shaft both being directly supported by the main body mounted chambers.

References Cited in the file of this patent

UNITED STATES PATENTS

| | | |
|---|---|---|
| 9,500 | Canby | Dec. 28, 1852 |
| 236,340 | Krake | Jan. 4, 1881 |
| 2,500,803 | Cockrell | Mar. 14, 1950 |
| 2,682,951 | Hamburg | July 6, 1954 |